March 2, 1937.  A. F. STAGMEIER  2,072,654
MACHINE FOR PACKING MERCHANDISE IN BAGS
Filed Feb. 1, 1932  9 Sheets-Sheet 9
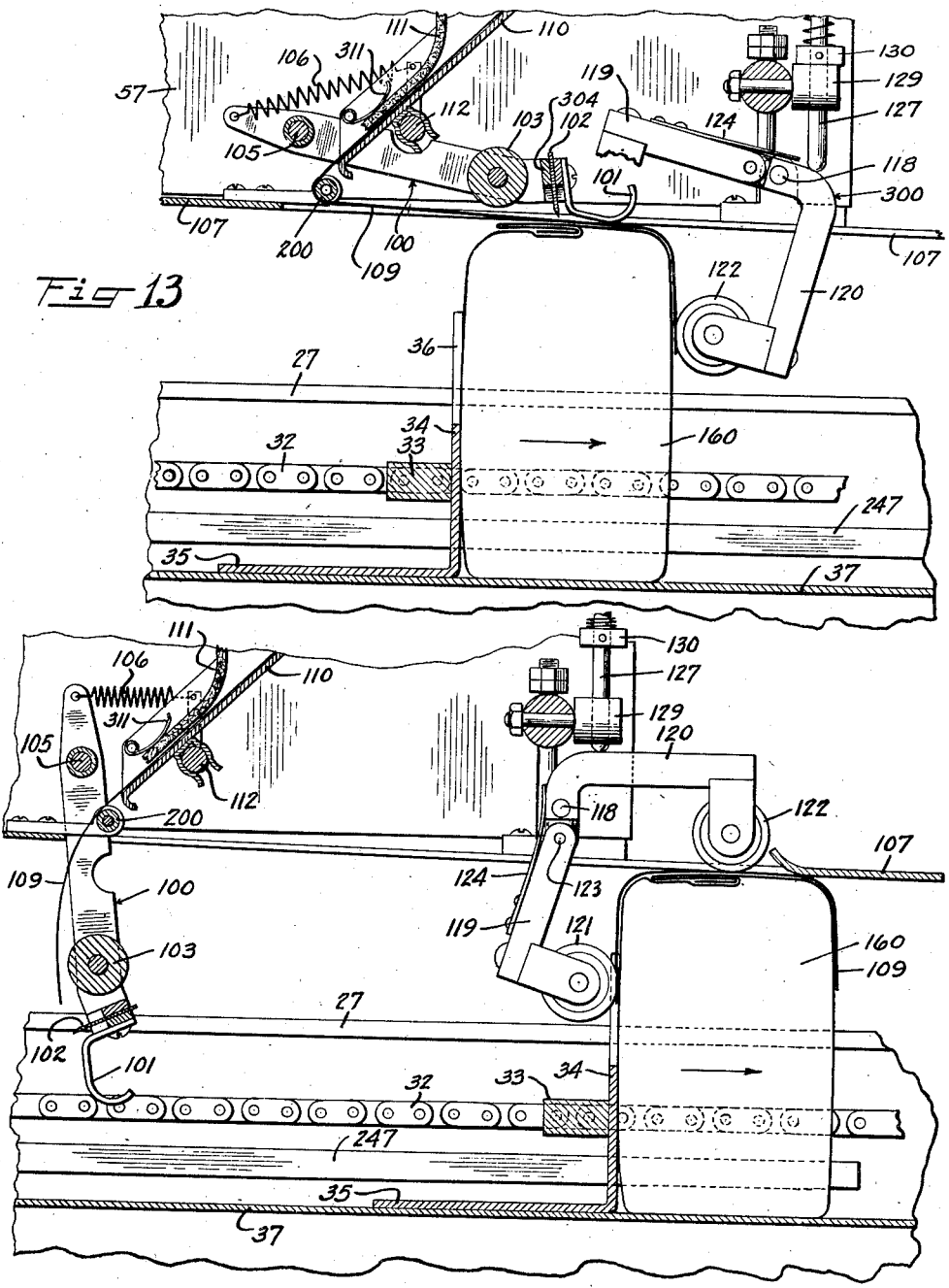

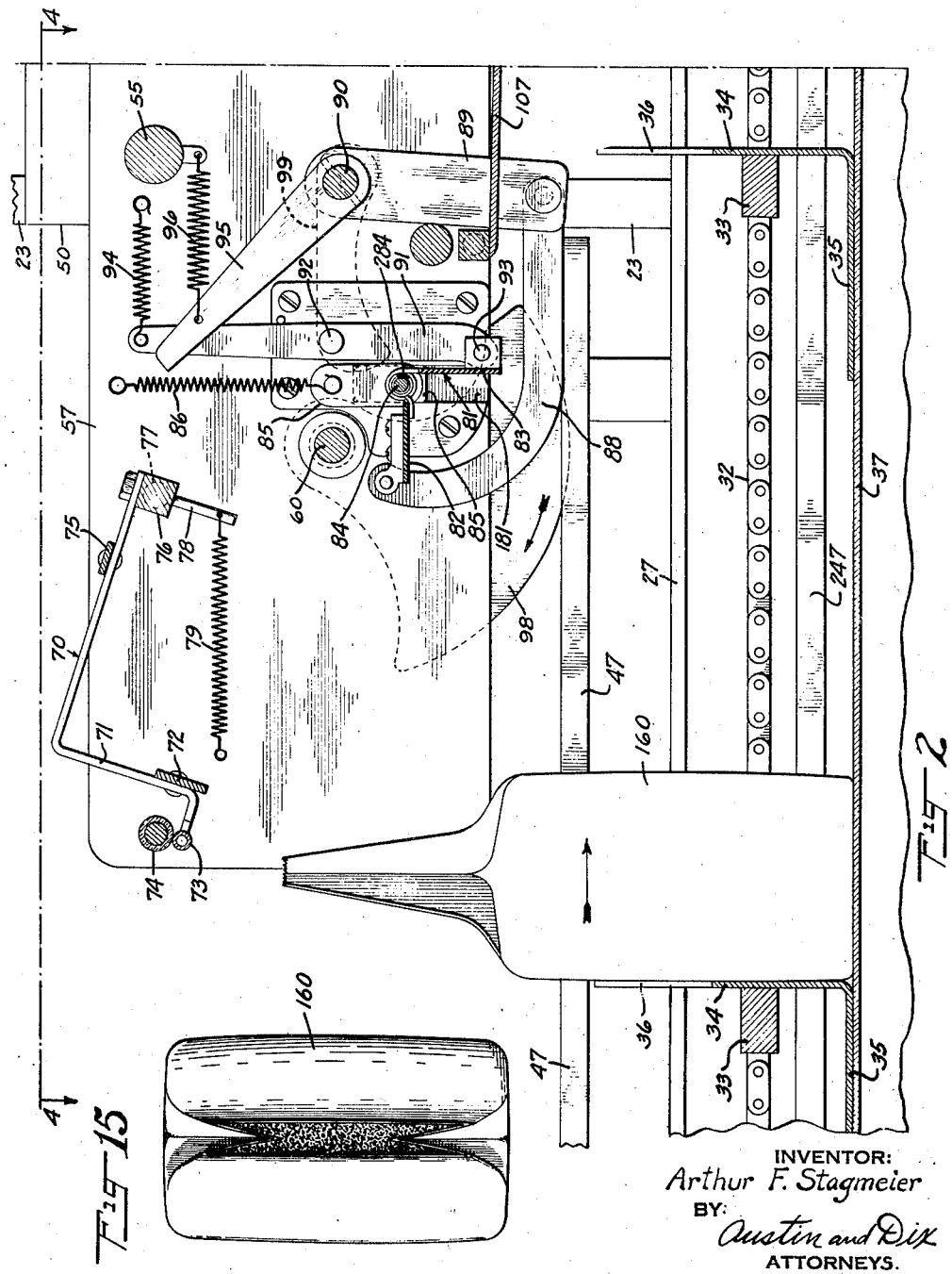

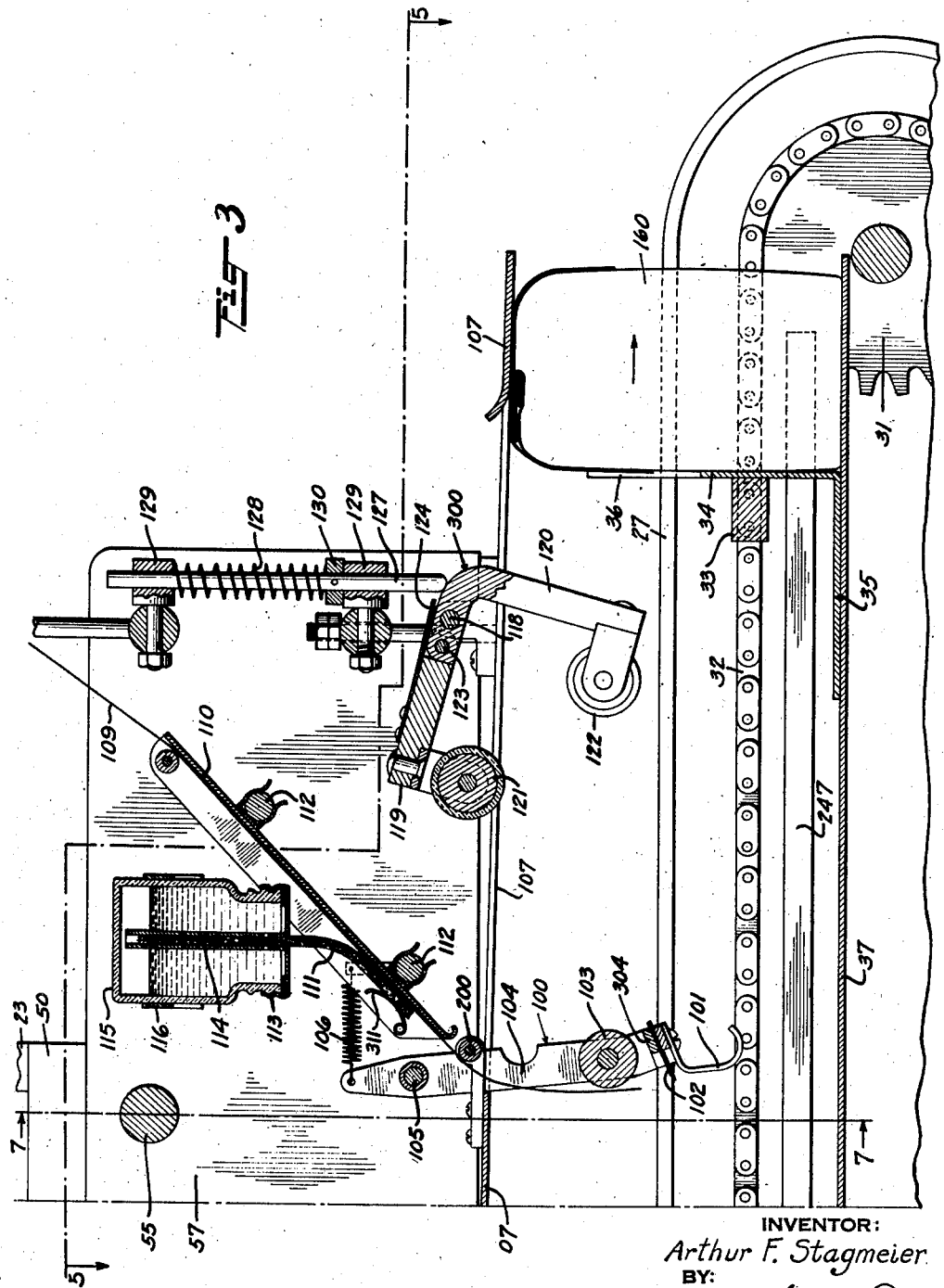

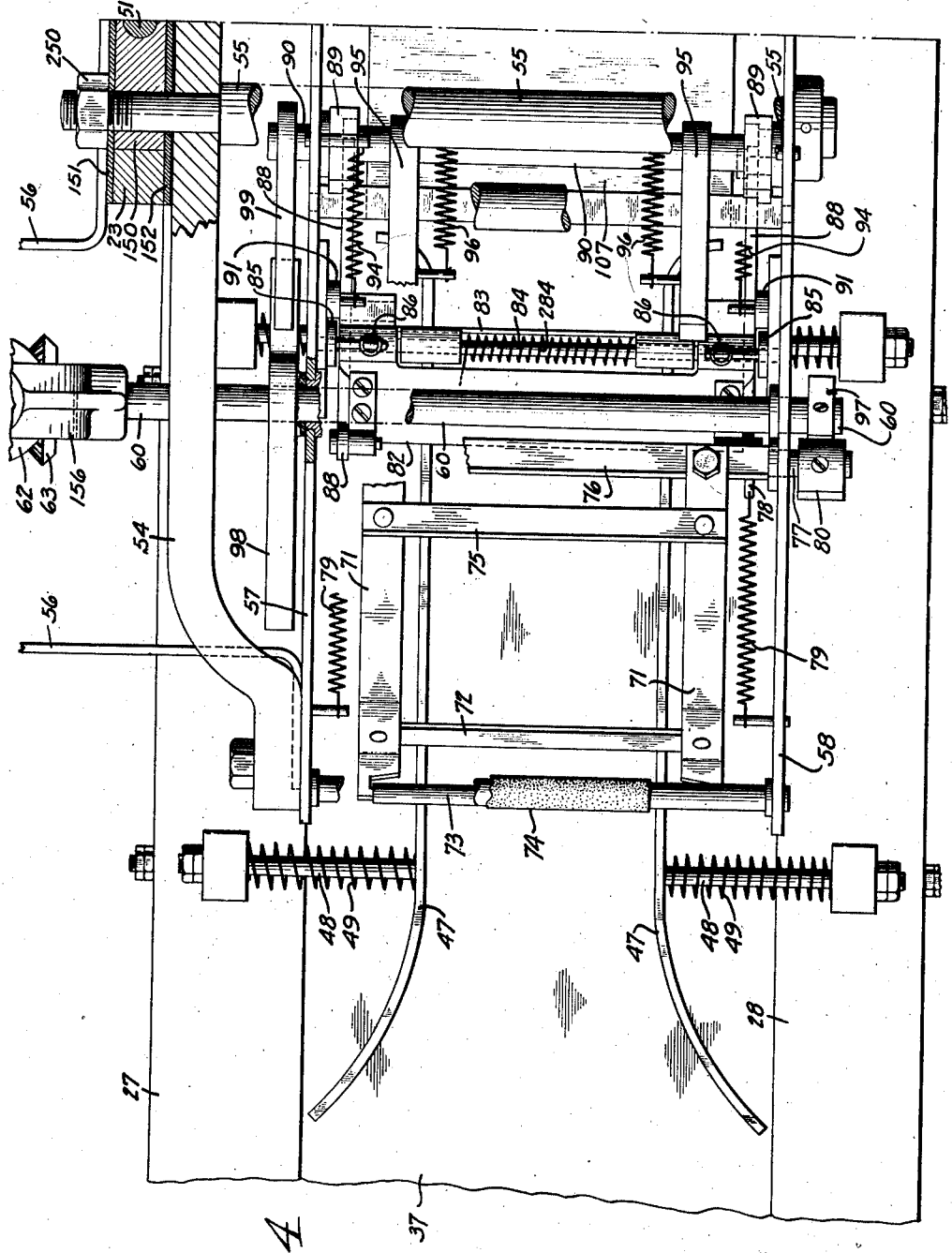

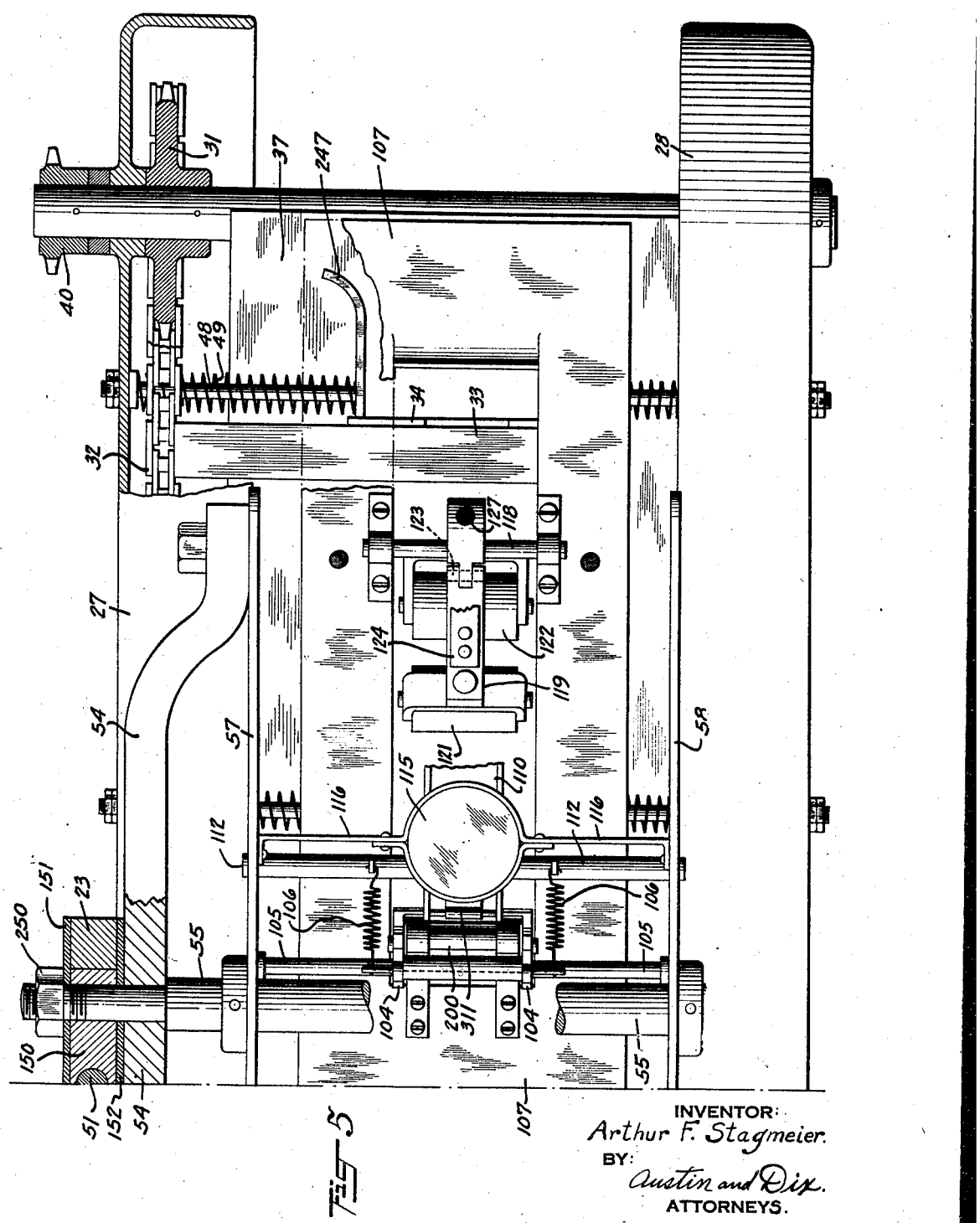

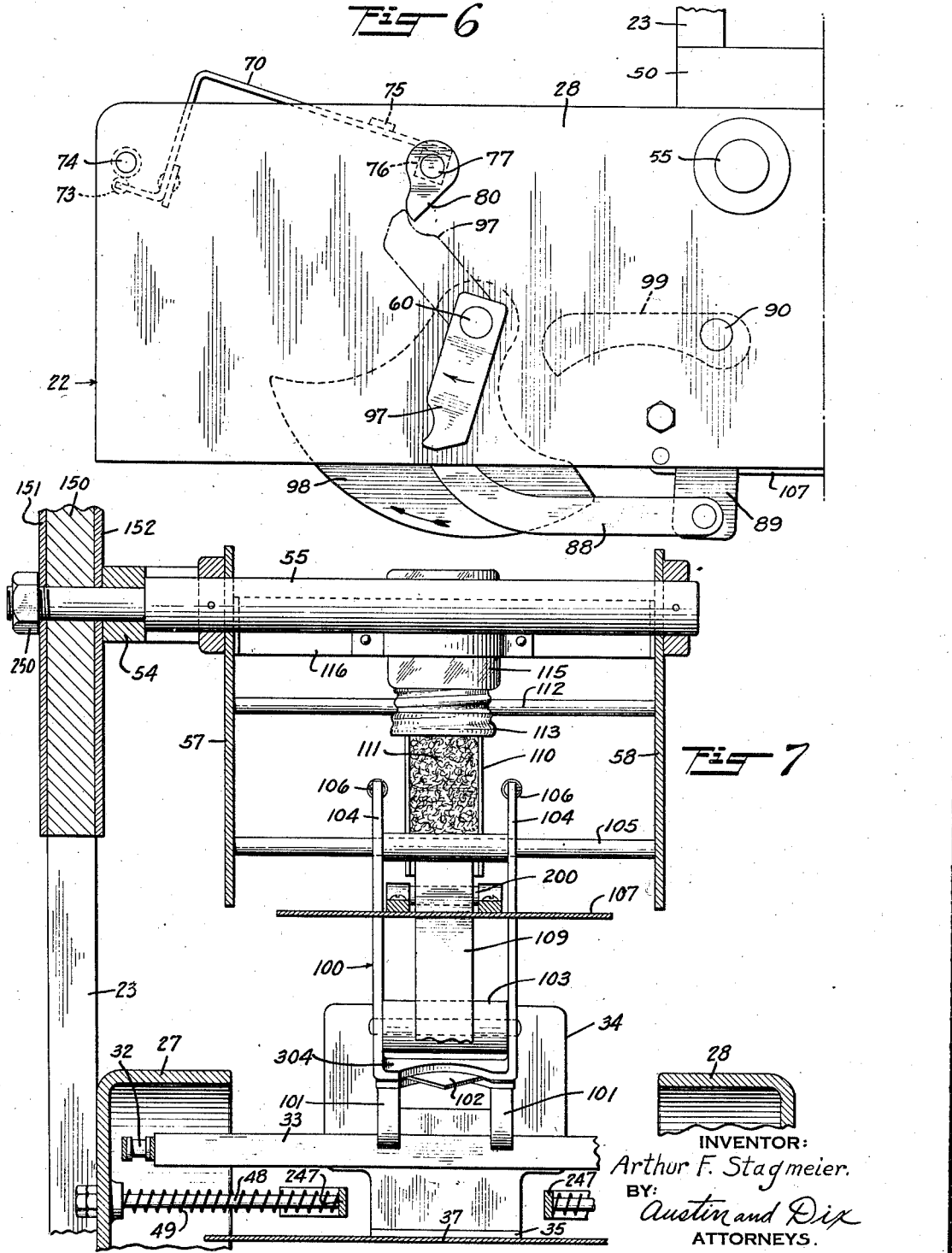

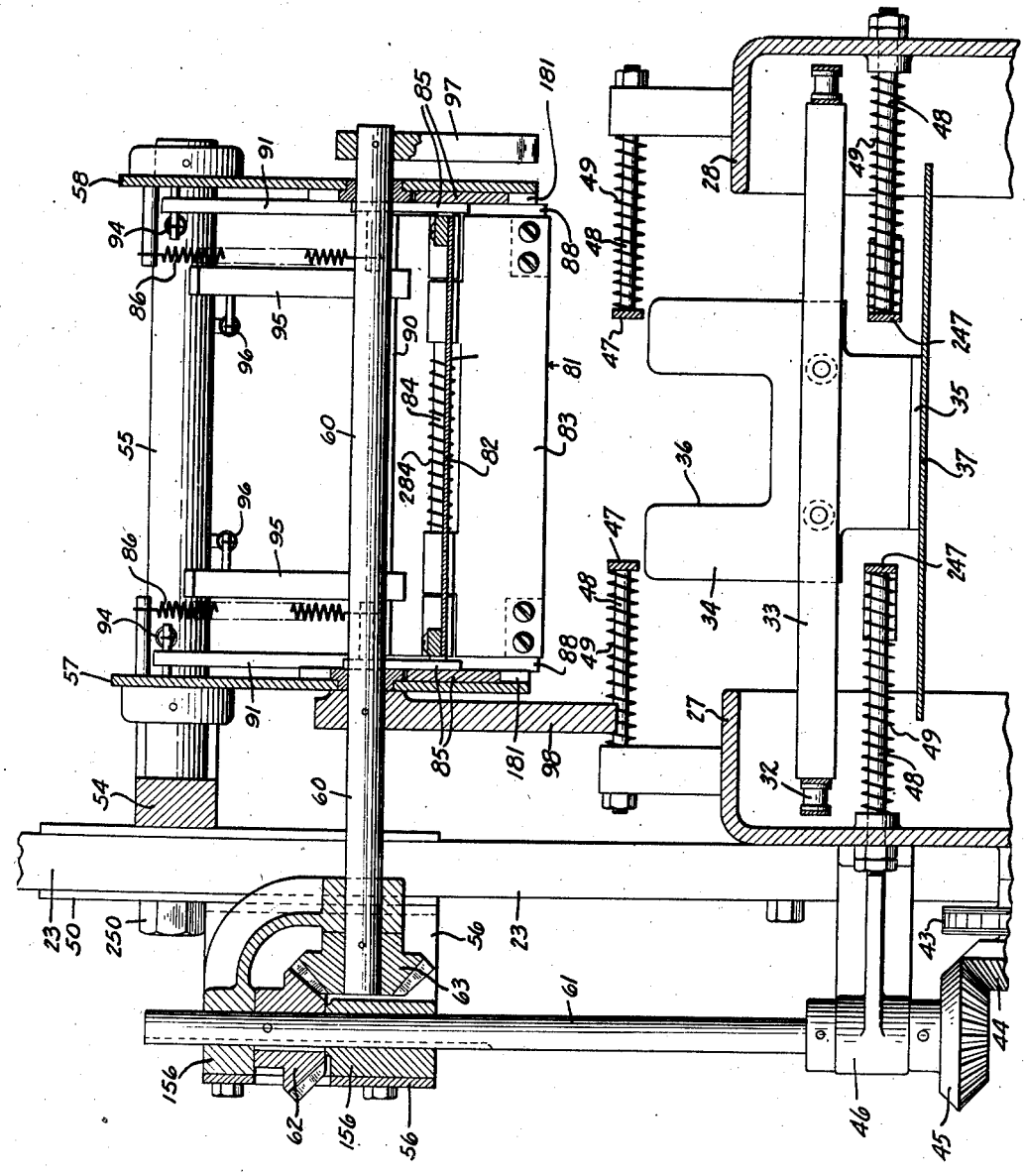

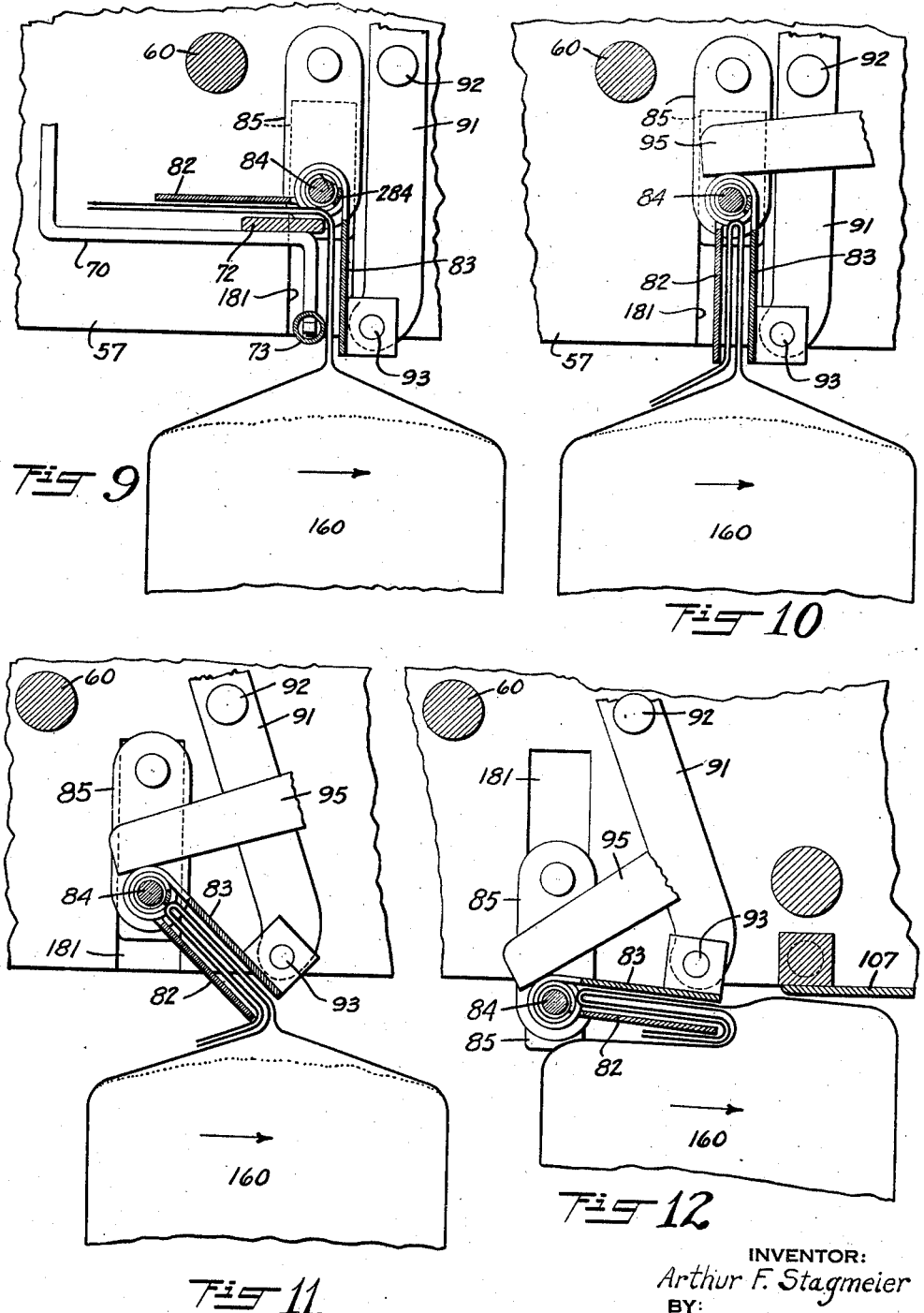

Patented Mar. 2, 1937

2,072,654

UNITED STATES PATENT OFFICE 2,072,654

MACHINE FOR PACKING MERCHANDISE IN BAGS

Arthur F. Stagmeier, Montclair, N. J., assignor, by mesne assignments, to Tape-O-Matic Machine Company, New York, N. Y., a corporation Application February 1, 1932, Serial No. 590,105

8 Claims. (Cl. 93—6)

The invention relates to packing machines, and more particularly to machines for packing merchandise in bags.

One of the principal objects of the invention is to provide a machine for automatically folding the top of the bag down on the body thereof after it has been filled with merchandise.

Another object of the invention is to provide a machine which will apply tape to a bag thus folded.

Another object of the invention is to provide a machine of the above character which is easily adjustable for different sizes of bags and for different weights of merchandise therein.

Another object of the invention is to provide a machine of the above character which is simple in construction and operation, whose parts are rugged and which will not easily get out of order.

Other objects will be apparent from the following description and claims when considered with the accompanying drawings, in which:

Fig. 2 is a vertical section through the rear part of the machine illustrating the bag folding mechanism;

Fig. 3 is a vertical section through the forward part of the machine illustrating the tape applying mechanism and being a continuation of Fig. 2;

Fig. 4 is a section on the line 4—4 of Fig. 2;

Fig. 5 is a section on the line 5—5 of Fig. 3 and being a continuation of Fig. 4;

Fig. 6 is an outside view of the part of the machine containing the folding mechanism;

Fig. 7 is a section on the line 7—7 of Fig. 3;

Fig. 8 is a section on the line 8—8 of Fig. 1;

Figure 1:
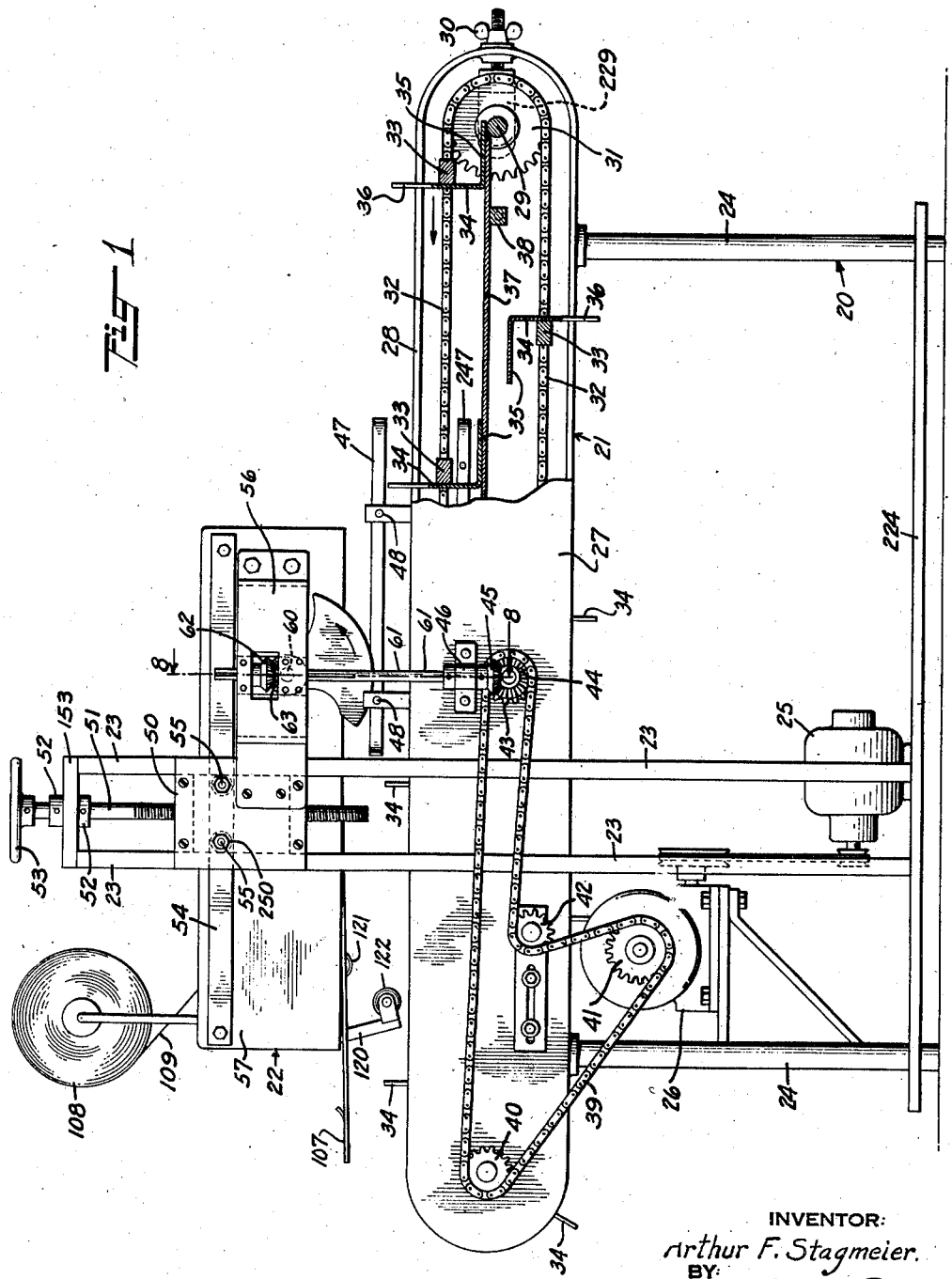
Fig. 1 is a side view of the complete machine with parts broken away.

Figs. 9 to 12, inclusive, illustrate diagrammatically the operation of the folding mechanism;

Figs. 13 and 14 illustrate diagrammatically the operation of the tape applying mechanism; and Fig. 15 illustrates the appearance of the top of the bag ready for operation by the folding mechanism.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, the front of the machine is to the left of the figure, and the back of the machine is to the right, and the bags are fed through from right to left in the direction of the arrow. In Figs. 2, 3, 4 and 5, however, the front of the machine is to the right and the bags are fed from left to right, as indicated by the arrow in Fig. 2.

The machine comprises in general a framework 20 supporting a conveyor 21 and having a vertical standard 23 which adjustably supports an operating head 22.

The frame 20 comprises a plurality of legs 24 and a lower shelf 224. The legs 24 support the conveyor 21 which is made up of a pair of channels 27 and 28, as indicated in Figs. 7 and 8.

The conveyor 21 comprises a pair of chains 32 mounted upon suitable sprockets, one of which is indicated by 31 (Fig. 1). These sprockets are mounted on suitable shafts journalled in the channel members 27 and 28, the shaft supporting the sprocket 31 being indicated by 29. The shaft 29 may be mounted on an adjustable member 229 which is secured to the end of the conveyor by an adjustable thumb nut 30 for adjusting the tension of the conveyor chains 32 in a manner well known in the art.

Connecting the chains 32 are a plurality of cross pieces 33 suitably spaced and in time with the folding mechanism, as will be described hereinafter. Each cross member 33 has a plate 34 attached thereto, each plate 34 having a rearwardly extending base 35 which slides along upon the table 37. Each plate 34 is furthermore provided with a deep notch 36 to clear the various operating mechanism, as hereinafter will appear. The table 37 is supported by various cross pieces 38 extending between the channels 27 and 28.

For guiding the bags laterally, a pair of upper guides 47 and a pair of lower guides 247 are provided (Figs. 2, 3, 4, 5, 7 and 8). These guides are mounted upon suitable rods, indicated in general by 48 (Fig. 8), which are slidably mounted upon adjacent parts of the frame. Springs, indicated in general by 49, surround the rods 48 to yieldably urge the guides 47 and 247 against the bags to center them with respect to the register plates 34.

Slidably mounted upon the standards 23 is a cross head 50. The cross head 50 (Figs. 4, 5, 6 and 8) comprises a center plate 150 and outer plates 151 and 152 which are disposed outside of the guides 23. An adjusting screw 51 is threaded through the center plate 150 and is journalled to the top plate 153 on the guides 23 (Fig. 1) and is kept from moving vertically by the collars 52. A hand wheel 53 is mounted on the screw 51 to adjust the height of the cross head 50.

Secured to the cross head 50 is a frame member 54 which is connected at its ends to the side plate 57 of the operating head 22. Two main cross rods 55 having shouldered ends clamp the frame member 54 to the cross head 50 and the parts of the cross head together by nuts 250. The main side frames 57 and 58 of the operating head 22 are mounted upon these main cross rods 55.

Connected to the side plate 57 and to the outside of the cross head 50 is a frame member 56 which supports a bearing member 156 (Fig. 8) for the vertical drive shaft 61. This forms a part of the driving mechanism for the entire machine which will now be described.

Mounted upon the shelf 224 (Fig. 1) is a drive motor 25. This drive motor is belted to the reduction gearing 26 which drives a sprocket 41. Sprocket 41 drives a chain 39 which passes over sprockets 40 and 43 which drive the conveyor and operating head, respectively. The chain 39 also passes over an idle sprocket 42 which is adjustably mounted to take up the slack in the chain.

Mounted on the same shaft with sprocket 43 is a bevel gear 44 which drives bevel gear 45 which is mounted upon the vertical shaft 61. This shaft is journalled in a fixed vertical position in a frame member 46 (Fig. 8).

Keyed to the shaft 61 by a feather key-way engagement is the bevel gear 62 which is mounted in fixed vertical position between the parts of frame 156. Meshing with bevel gear 62 is bevel gear 63 which drives shaft 60 journaled in the side plates 57 and 58, which is the main drive shaft for the operating head 22.

The feather key-way connection between shaft 61 and gear 62 permits vertical adjustment of the operating head 22 by the rotation of the hand wheel 53.

Considering now the construction of the operating head 22, as above stated it comprises a pair of side plates 57 and 58 which are mounted upon the main cross rods 55. Between these side plates is mounted the folding mechanism shown in Figs 2 and 4 and the tape applying mechanism shown in Figs. 3 and 5.

Referring to the folding mechanism, this comprises a positioning member denoted generally by 70. The positioning member 70 comprises a pair of arms 71 connected by cross members 72 and 75. Journalled between the arms 71 is a roller 73. The arms 71 are connected to a pivot member 76 having reduced ends 77 which are journalled in the side plates 57 and 58.

To yieldably hold the positioning member 70 in the position shown in Fig. 2, a pair of spring 79 are provided connecting at one end to pins 78 secured to the pivot member 76 and at the other end to pins in the side plates. To limit the upper movement of the positioning member 70 a stop member 74 is provided positioned between the side plates and covered with resilient material, as indicated.

For folding the top of the bag a hinge "device", shown in Figs. 2 and 9 to 12, inclusive, is provided. This hinge device, denoted generally by 81, comprises a rear plate 82 and a forward plate 83 mounted upon a shaft 84. The shaft 84 is mounted in end plates 85 which are movable vertically in slots 181 in the main side plates. Springs 86 resiliently hold the shaft 84 in uppermost position. A coil spring 284 surrounds the shaft 84 and yieldably holds the plates 82 and 83 apart.

For controlling the position of the rear plate 82 a pair of puller members 88 are provided pivoted to the rear plate 82 and to arms 89 which are secured to cooperating shaft 90.

For controlling the position of the forward plate 83 a pair of radius members 91 are provided pivoted at 92 to the main side plates and at 93 to the forward hinge plate.

For downwardly pushing the entire hinge assembly a pair of pushers 95 are provided mounted upon the operating shaft 90. Springs 94 yieldably hold the radius arms 91 in the position shown and springs 96 yieldably hold the pushers 95 in the positions shown in Fig. 2.

For driving the operating shaft 90 a cam follower 99 is provided, this cam follower being driven by cam 98 mounted upon the drive shaft 60. Drive shaft 60 also supports a trip cam 97 which engages a follower 80 mounted upon the reduced end 77 of shaft member 76 of the positioning member 70.

As the bag, indicated by 160 in Fig. 2, is pushed along upon table 37 by the register plates 34, it is operated upon by the folding mechanism just described, the operation being described hereinafter. This folds down the top of the bag which then passes under the plate 107 to the tape applying mechanism illustrated in Figs. 3 and 5.

The tape applying mechanism comprises a combined applying device and cutter indicated by 100. This member is mounted upon a pivot 105 and it is yieldably held in the position shown in Fig. 3 by springs 106.

The member 100 is preferably made U-shaped, having side arms 104 which are connected at their lower ends, as indicated at 304. Secured to the end 304 is the cutting blade 102 which may be slightly pointed as indicated in Fig. 7 and a pair of rounded spring fingers 101. Pivoted between the side arms 104 is a roller 103.

The tape is supported on a roll indicated by 108 in Fig. 1 above the operating head 22. The tape, which may be any suitable sealing tape, either of paper or cloth, having adhesive gum on one side thereof, is indicated by 109 and passes down an inclined guide 110 mounted on suitable cross rods 112. The gummed side of the tape is up and wipes against a wick 111, which may be held against the tape by a small spring 311, if desired. The tape passes over a roller 200 and back of the applying roller 103, as shown in Fig. 3.

For keeping the wick 111 wet a water reservoir is provided, made up of an inverted glass jar 115 held by a support 116. Screw threaded upon the bottom of the jar 115 is a cap 113 having a vertical guide 114 secured thereto, which is perforated to allow the water to saturate the wick 111.

For pressing the gummed tape tightly onto the bag after it has been treated by the apparatus described above, a compound member, indicated by 300 in Fig. 3 is provided. This comprises a forward arm 120 pivoted at 118 to supports mounted on the top plate 107. It will be noted that the top plate 107 is cut away to permit the operation of the members 100 and 300.

Pivoted to the forward member 120 is a rear member 119, the pivot being at 123. The shape of the members 119 and 120 prevents their approach to any position closer than that indicated in Fig. 3. To yieldably prevent their separation a leaf spring 124 is secured to rear member 119. The action of this member is illustrated, for example, in Fig. 14.

The members 119 and 120 support rollers 121 and 122 for a purpose hereinafter described. For holding the entire compound member 300 in the proper position to engage the bag as it comes along a rod 127 is slidably mounted in support 129 which is secured to local cross members. A coil spring 128 surrounding rod 127 and acting between the collar 130 and the upper support 129 yieldably urges the rod 127 downwardly.

To operate the machine, it will be understood that the bag, which may be made of paper, is first filled and weighed, either by hand or by automatic means (not shown). The bag is then jarred either by hand or by automatic means (not shown) to settle the coffee or other pulverulent material. The end creases of the bag are then tucked in either by hand or by machine (not shown) so that the top of the bag appears as indicated in Fig. 15. The bag which has been filled with material is then placed upon the feed table 37 where it remains until it is engaged by a register plate 34, as indicated in Fig. 2. This slides the bag along in the direction of the arrow, carrying it against the hinge device 81, which is open to receive the top thereof, as indicated in Fig. 2. It will be understood that the folding apparatus is in time with the conveyor so that the operations occur at the proper time.

As the top of the bag moves into the open hinge the positioning member 70 quickly takes the position shown in Fig. 9, firmly folding the top of the bag, as shown. The positioning member 70 immediately retracts and the rear hinge plate moves down to the position shown in Fig. 10, folding the top of the bag still further.

As the bag 160 continues to move along in the direction of the arrow, the pusher members 95 push downwardly on the hinge device and the puller members 88 pull on the bottom of the hinge device, causing the latter to take the position first as shown in Fig. 11 and then as shown in Fig. 12. From the position shown in Fig. 12, the bag movement pulls the folded top out of the hinge device and under the top plate 107, after which the hinge parts return to the position shown in Fig. 2 to be ready for the next bag.

The bag with its top folded is carried to the combined tape applier and cutter 100 which is in the position shown in Fig. 3. The tape is also in position to be engaged by the bag, the roller 103 pressing the end of the tape firmly against the front of the bag. As the bag moves along still further, the roller 103 swings up the forward surface of the bag, firmly pressing the adhesive tape into engagement with the bag. The member 100 then slides across the top of the bag, the curved fingers 101 preventing the knife 102 from cutting the tape. The bag then engages the roller 122, as indicated in Fig. 13.

As the bag moves still further the roller 122 further presses the tape onto the bag and when the bag rides out from under the curved fingers 101, the member 100 suddenly drops, causing the knife 102 to cut the tape. The arm 100 drops to the position shown in Fig. 14 and is ready for the next bag. The end of the tape attached to the bag is pressed down the back side of the bag by the rear roller 121, as indicated in Fig. 14. The deep notches 36 in the register plates 34 permit the action of the rollers 121 and 122 and also the action of roller 103.

The bag is then delivered from the conveyor by any suitable delivery means (not shown) and is ready for shipment.

An advantage of this machine is its ability to be used with different sizes of bags containing different weights of merchandise. It is only necessary to adjust the height of the operating head 22 by the hand wheel 53 to meet the heights of different bags. The width of the bag or the length from front to rear within the limits of the machine does not affect the operation of the machine nor require special machine adjustment.

This machine is suitable for creasing, and applying tape to, any kind of paper bag which has a top which can be folded in the manner described above. Furthermore, the bags may contain pulverulent material such as coffee or any other kind of merchandise which might be recited as rice, seeds, insecticides, and milled products such as hominy, etc.

The automatic folding of and the applying of tape to the bag eliminates hand labor for this purpose and results in a great saving.

While certain novel features of the invention have been disclosed and are pointed out in the annexed claims, it will be understood that various omissions, substitutions and changes may be made by those skilled in the art without departing from the spirit of the invention.

What is claimed is:

1. In a machine for folding paper bags and the like, a hinge-like device comprising a pivot, a rear hinge plate and a forward hinge plate mounted on said pivot, means for bringing said plates together to fold over on itself the top of the bag between said plates, and means for moving said plates as thus brought together flatwise against the top of the body of the bag to fold the folded bag top against the body of the bag.

2. In a machine for folding paper bags and the like, a hinge-like device comprising a pivot, a rear hinge plate and a forward hinge plate mounted on said pivot, said rear hinge plate normally having an upward position and said forward hinge plate normally having a depending position to receive the top of the bag to be folded, means for tucking the bag top in the angle formed by said plates, means for moving downwardly said rear plate to fold the bag top and to clamp it between the plates, means for progressively moving the bag past said devices, means for moving said pivot downwardly as the bag progresses to cause said plates to follow the bag and to fold said folded bag top against the top of the body of the bag, further movement of said bag withdrawing the folded portions from between said plates.

3. In a machine for folding the tops of paper bags and the like, a hinge device comprising a pivot, a vertical slide for said pivot, forward and rear hinge plates mounted on said pivot, a conveyor for moving bags of merchandise having tops to be folded under said device, a positioning member for tucking the bag top into the angle formed by the initial position of said plates, a puller member attached to said rear plate, a spring member normally holding said pivot in its upper position, a radius member pivoted to said forward plate, an operating shaft having an arm attached thereto, said arm being pivoted to said puller member, a pusher member connected to said shaft for pushing down on said pivot, a cam follower on said shaft, a second shaft supporting said positioning member, a second cam follower on said second shaft, a cam shaft, cams on said shaft engaging said followers, respectively, spring means for immediately returning said positioning member to normal position after it has tucked in said bag top, said plates following said bag a limited distance, further movement of the bag withdrawing the folded top thereof from between said plates.

4. In a machine for folding the tops of paper bags and the like, a hinge device comprising a pivot, a vertical slide for said pivot, forward and rear hinge plates mounted on said pivot, a conveyor for moving bags of merchandise having tops to be folded under said device, a positioning member for tucking the bag top into the angle formed by the initial position of said plates, a puller member attached to said rear plate, a spring member normally holding said pivot in its upper position, a radius member pivoted to said forward plate, an operating shaft having an arm attached thereto, said arm being pivoted to said puller member, a pusher member connected to said shaft for pushing said pivot down said slide, a cam follower on said shaft, a second shaft supporting said positioning member, a second cam follower on said second shaft, a cam shaft, cams on said shaft engaging said followers, respectively.

5. In a combined folding and tape-applying machine for paper bags and the like, a conveyor member comprising a feed plate, a pair of spaced endless chains having their plys above and below said plate, register members connecting said chains, an operating head above said conveyor, means for adjusting the height of said operating head, a power drive device for driving said operating head and conveyor, movable devices on said operating head for folding the tops of bags containing merchandise, and devices on said operating head for applying tape to the bags with their tops thus folded, said tape-applying device cutting a separate length of tape for each bag and having the length of tape controlled by the distance across the top of each bag.

6. In a combined folding and tape-applying machine for paper bags and the like, a conveyor member comprising a feed plate, a pair of spaced endless chains having their plys above and below said plate, cross members connecting said chains, register plates attached to said cross members and having projecting feet sliding along said feed plate, said register plates having deep notches in the middle of their upper edges, an operating head above said conveyor, means for adjusting the height of said operating head, a power drive device for driving said operating head and conveyor, devices on said operating head for folding the tops of bags containing merchandise, said bags being pushed along said feed plate by said register plates, and devices on said operating head for applying tape to the bags with their tops thus folded.

7. In an apparatus for packing merchandise in bags, a conveyor for moving the bags partially filled with merchandise with the tops of the bags projecting, an operating head above said conveyor for receiving the tops of the bags, a movable member, a pair of plates pivoted on said movable member for engaging the tops of each bag and folding the same upon itself and positioning said folded top down substantially in contact with the folded portion of the bag, means on said head for applying tape to the top of said bag as thus folded and positioned.

8. An apparatus for packing merchandise in bags, a conveyor for moving the bags partially filled with merchandise with the tops of the bags projecting, an operating head above said conveyor for receiving the tops of said bags, two plates supported upon said head for engaging and folding the top of each bag upon itself and thereafter downward substantially into contact with the filled portion of said bag, said folding and positioning of the top being accomplished while said bag is in motion, said members mounted to pivotally fold against each other and to thereafter be moved to a substantially horizontal position, and means on said head for applying tape to the top of the bag as thus folded and positioned.

ARTHUR F. STAGMEIER.